United States Patent [19]

Jacyno

[11] 4,300,357
[45] Nov. 17, 1981

[54] BY-PASS VALVE FOR AUTOMOTIVE AIR CONDITIONING SYSTEM

[75] Inventor: Henry Jacyno, Franklin, Wis.

[73] Assignee: The Singer Company, Stamford, Conn.

[21] Appl. No.: 36,762

[22] Filed: May 7, 1979

[51] Int. Cl.³ .............................................. B60H 3/04
[52] U.S. Cl. ................................... 62/239; 62/196 R; 137/498; 137/516.25
[58] Field of Search ..................... 62/239, 196 R, 217; 137/516.25, 516.27, 541, 498

[56] References Cited

U.S. PATENT DOCUMENTS

| 1,360,960 | 11/1920 | Kudla | 137/516.25 |
| 2,307,949 | 1/1943 | Phillips | 137/498 |
| 2,731,805 | 1/1956 | Kuhn | 62/196 R |
| 2,775,868 | 1/1957 | Trevaskis | 137/516.25 |
| 3,085,589 | 4/1963 | Sands | 137/516.25 |
| 3,122,162 | 2/1964 | Sands | 137/498 |
| 3,396,550 | 8/1968 | Cawley | 62/196 R |

Primary Examiner—Lloyd L. King
Attorney, Agent, or Firm—Bayard H. Michael

[57] ABSTRACT

The valve opens in response to a predetermined small pressure differential acting across the valve. As the pressure differential increases, the valve throttles the flow and when a high pressure differential exists the valve closes. The valve is designed to be placed in a by-pass circuit in an automotive air conditioning system to provide adequate flow under low cooling loads to cool and lubricate the compressor. Under normal and high evaporator loads, the by-pass flow is throttled or closed off completely to avoid needless consumption of energy.

9 Claims, 3 Drawing Figures

BY-PASS VALVE FOR AUTOMOTIVE AIR CONDITIONING SYSTEM

BACKGROUND PRIOR ART

In automotive air conditioning systems, the amount of refrigerant flowing through the compressor is dependent upon the cooling load on the evaporator. At low loads the thermostatic expansion valve does not pass enough refrigerant to feed back to the compressor to cool and lubricate the compressor. Under these conditions, it is necessary to by-pass the evaporator and feed more refrigerant back to the compressor to prevent it from overheating. The by-pass valve presently used in automotive air conditioning systems comprises a simple check valve substantially the same as a tire valve of the Shrader type. This valve opens at low pressure differential and remains open thereafter. Therefore, under high evaporator load (high cooling load) conditions, the pressure relief valve is still open and by-passing refrigerant back to the compressor. This means that the compressor is doing needless extra work and wasting energy.

SUMMARY OF THE INVENTION

The purpose of this invention is to provide a pressure responsive by-pass valve which will open at a small pressure differential but will thereafter throttle and eventually close the by-pass as the pressure differential increases. This results in by-passing the evaporator only when by-pass is required and this in turn results in a substantial energy saving.

DESCRIPTION OF THE PREFERRED EMBODIMENT

Figure 1:
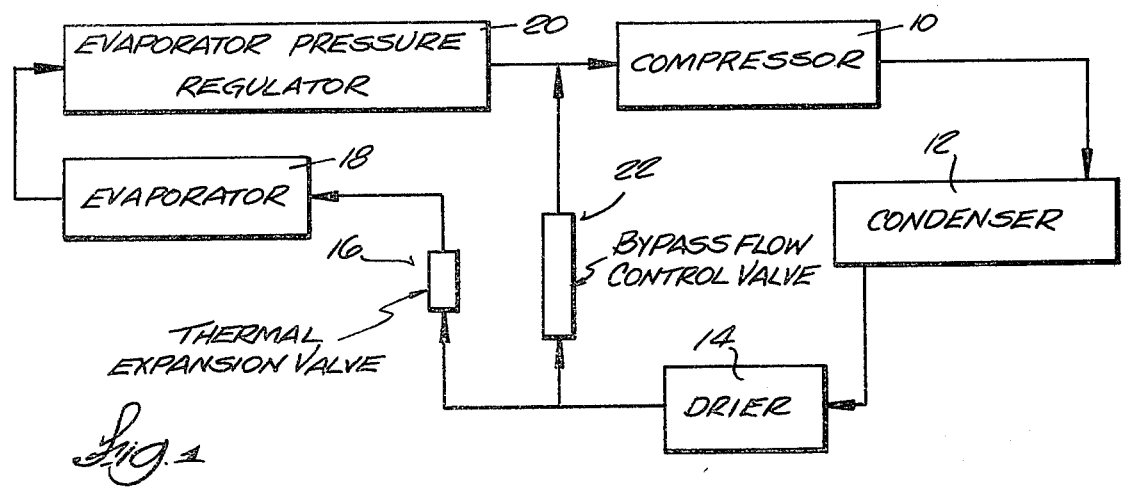
FIG. 1 is a schematic representation of a typical automotive air conditioning system to illustrate the location and purpose of the by-pass valve.

As shown in FIG. 1, compressor 10 delivers refrigerant to condenser 12 and the drier 14. Thermostatic expansion valve 16 regulates flow to evaporator 18 in accordance with the (cooling) load. Refrigerant is then returned to the compressor through the evaporator pressure regulator valve 20. Under light load conditions the thermostatic expansion valve starves the evaporator and, therefore, there is very little refrigerant flow returning to the compressor which, as a result, cannot deliver much refrigerant to the condenser and the high side of the system. This results in two conditions. First, the condenser does not receive adequate refrigerant to lubricate and cool the compressor. Secondly, there is relatively low pressure differential between the high and low sides of the system, that is between the inlet to the thermostatic expansion valve and the compressor inlet. The practice in the trade has been to provide a simple check valve controlling by-pass flow from the TXV inlet to the compressor inlet. This opens at a relatively low pressure differential and lets refrigerant flow from the high side back to the compressor to get enough refrigerant flow to lubricate the compressor and keep it cool. As the evaporator load increases, there is no need for the by-pass but the check valve presently used continues to by-pass refrigerant and this results in wasted energy.

The present by-pass valve 22 is located as indicated in FIG. 1, and its location per se is not novel. All the valve serves to do is by-pass refrigerant from the high side to the low side. The construction and function of the valve is, however, different than the prior art.

Figure 2:
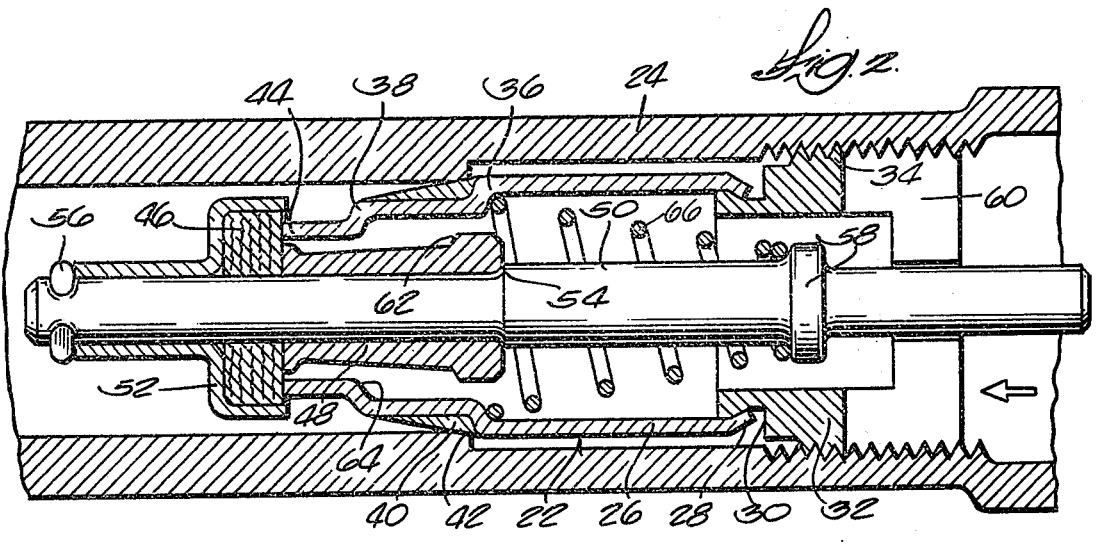
FIG. 2 is a section through the valve with the valve in its closed position.
Figure 3:
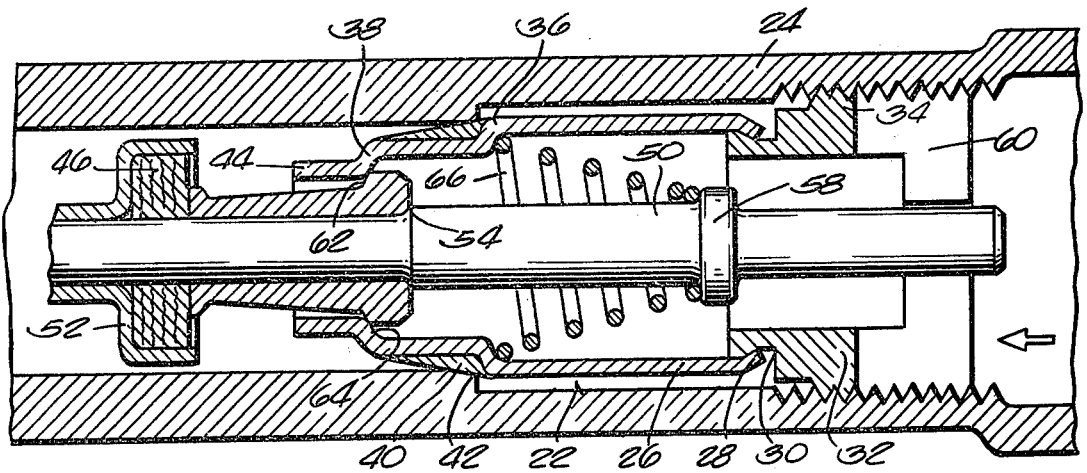
FIG. 3 is similar to FIG. 2 but shows the valve in its full actuated position in which the valve has gone through a sequence from FIG. 2 to open the valve, throttle the valve and re-close it in response to a high pressure differential existing across the valve.

In FIGS. 2 and 3, the valve is shown as if mounted in a conduit and this is for illustrative purposes. The valve would generally be mounted in the thermostatic expansion valve body. The large end 28 of body shell 26 of valve 22 is rolled into groove 30 provided in nut 32 which is externally threaded at 34 to permit mounting the valve in the interior of conduit 24 (or inside the body of thermostatic expansion valve in usual practice). The rolled edge 28 of the body 26 serves to mount the body on the nut but does not prevent rotation of the nut relative to the body during assembly of the valve 22 into conduit 24. The body is provided with two stepped shoulders 36 and 38 and gasket sealing material 40 is mounted between the steps on the outside of the body to be pressed against the internal shoulder 42 in conduit 24 (or in the TXV valve body) as the nut 34 is turned into conduit 24. This seals against flow on the outside of the valve 22.

The reduced diameter end 44 of the shell 26 is engaged by the gasket 46 when the valve is closed. The flow controlling and throttling action is obtained by means of the tapered spool 48 held on shaft 50 by gasket 46 and gasket retainer 52 having an enlarged end in which the gasket 46 is supported. The gasket retainer 52 is moved down shaft 50 until the spool 48 abuts the shoulder 54 on the shaft and then the shaft is pinched at 56 to cold flow the shaft against the outer end of the retainer to fix the retainer on the shaft.

The shaft is provided with an annular seat 58 and the coil spring 66 is compressed between this seat and the inside of shoulder 36 in the body shell 26. This biases the shaft 50 to the right and moves the gasket or valve facing material 46 against the end of the reduced diameter portion 44 of the body shell 26. The right hand end of the shaft 50 is guided in web 60 which is part of the nut 32. The operative valve port is the area between the inside diameter of the reduced diameter portion 44 of shell 26 and the spool. High side pressure exists on the right side of the valve and the low side pressure exists at the left side of the valve. When the pressure differential is adequate to overcome the conical spring 66, the valve will open as the shaft moves to the left and to move the gasket 46 away from the end of the body shell 26. This will permit low flow between the spool and the inside of the neck 44 of the shell. As the pressure increases, the available flow area will increase as the spool moves to position the smaller spool diameter at the opening and then the increasing diameter of the spool comes into play and starts throttling or reducing the area between the spool and the neck 44. This will tend to balance area and pressure to obtain uniform flow. When the pressure gets high enough, the shoulder 62 at the enlarged end of the spool will engage the inside shoulder 64 of the shell to shut off flow through the by-pass to the extent that it can be shut off by a metal-to-metal seat. For all practical purposes this substantially shuts off the by-pass flow.

By careful selection of the taper of the spool, the by-pass flow can be kept substantially constant when there is low pressure differential between the high and low sides of the air conditioning system. When this by-pass flow is no longer needed, this design shuts off the by-pass and avoids wasted energy.

From the foregoing, it will be apparent that the gasket or valve facing 40 constitutes a shut-off valve in cooperation with the end of the body 26. When the pressure differential overcomes the spring 66, the valve opens and the tapered throttling valve section comprising the tapered spool comes into play to throttle the flow as the pressure differential increases to thereby achieve a relatively uniform flow through the valve until such time as the enlarged head 62 of the spool engages the shoulder 64 to shut off the flow.

I claim:

1. In an automotive air conditioning system of the type having a thermostatic expansion valve regulating flow from a compressor to an evaporator connected to the compressor inlet and having a by-pass from the valve inlet to the compressor inlet, the by-pass being controlled by a check valve which opens in response to a predetermined pressure differential between the by-pass inlet and outlet, the improvement comprising a shut-off valve in the by-pass operative to substantially close the by-pass in response to a predetermined high pressure differential between the by-pass inlet and outlet.

2. In the system of claim 1 in which the check valve and the shut-off valve are interconnected and control flow through a common port.

3. The system of claim 2 in which the check valve and shut-off valve have a tapered throttling valve between them and the throttling valve cooperates with said port to progressively decrease the flow area as the pressure differential increases from that required to open the check valve to that required to close the shut-off valve.

4. The system of claim 1 including a throttling valve operative to gradually decrease the by-pass flow area as the pressure differential increases up to the predetermined high pressure differential operative to close the by-pass.

5. A valve comprising,
a valve body having an inlet and an outlet,
a valve port between the inlet and the outlet and having a valve seat on both the upstream and downstream sides of the port,
first valve means in said body on the downstream side of the port,
second valve means in said body on the upstream side of the port,
a common member interconnecting the first and second valve means,
a spring biasing both valve means whereby the first valve means is biased to close on the valve seat on the downstream side of the port and is responsive to the pressure differential between the inlet and the outlet to open at a predetermined low differential,
a predetermined high pressure differential being operative to close the second valve means on the valve seat on the upstream side of the port.

6. A valve according to claim 5 including a throttling valve operative to progressively decrease the flow area through the valve port as the pressure differential increases from said low differential to said high differential.

7. A valve according to claim 5 in which a tapered throttling valve is mounted on said common member between the first and second valve means to cooperate with said port to progressively decrease the flow area as the member moves in response to increasing pressure differential from opening the first valve means to closing the second valve means.

8. An automotive air conditioning system of the type having a thermostatic expansion valve regulating flow from a compressor to an evaporator having its outlet connected to the compressor inlet and provided with a by-pass valve according to claim 5 connected between the expansion valve inlet and the compressor inlet so the evaporator is by-passed when the first valve means opens in response to a low pressure differential and the evaporator is not by-passed when the second valve means closes said port under high pressure differential conditions indicative of high cooling load on the system.

9. A valve comprising,
a valve body having an inlet and an outlet and a valve port therebetween,
a check valve on the downstream side of the port,
a shut-off valve on the upstream side of the port,
a tapered spool-like throttling valve passing through the port and interconnecting the check valve and the shut-off valve to form a valve assembly,
a spring biasing the valve assembly to seat the check valve on the port,
said valve assembly moving against the bias of the spring to open the check valve in response to a predetermined low pressure differential between the inlet and the outlet and to thereafter move the throttling valve relative to the port to decrease the flow area as the pressure differential increases until a predetermined maximum pressure differential is reached at which time the shut-off valve seats on the port.

* * * * *